United States Patent
Sun et al.

(10) Patent No.: US 11,069,342 B2
(45) Date of Patent: Jul. 20, 2021

(54) METHOD FOR TRAINING VOICE DATA SET, COMPUTER DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Tao Sun, Shenzhen (CN); Yueteng Kang, Shenzhen (CN); Xiaoming Zhang, Shenzhen (CN); Li Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 191 days.

(21) Appl. No.: 16/436,479

(22) Filed: Jun. 10, 2019

(65) Prior Publication Data
US 2019/0318723 A1    Oct. 17, 2019

Related U.S. Application Data

(63) Continuation of application No. PCT/CN2018/075595, filed on Feb. 7, 2018.

(30) Foreign Application Priority Data

Mar. 10, 2017  (CN) .......................... 201710143053.2

(51) Int. Cl.
   *G10L 15/06*   (2013.01)
   *G10L 15/02*   (2006.01)
   (Continued)

(52) U.S. Cl.
   CPC ............ *G10L 15/063* (2013.01); *G10L 15/02* (2013.01); *G10L 15/04* (2013.01); *G10L 15/142* (2013.01);
   (Continued)

(58) Field of Classification Search
   CPC ...... G10L 15/16; G10L 15/063; G10L 15/142; G10L 15/144
   See application file for complete search history.

(56) References Cited

U.S. PATENT DOCUMENTS

2014/0337026 A1* 11/2014 Ichikawa .............. G10L 15/063
                                                    704/243
2015/0019214 A1*  1/2015 Wang ..................... G10L 15/34
                                                    704/232
(Continued)

FOREIGN PATENT DOCUMENTS

CN       101866418 A    10/2010
CN       104268127 A     1/2015
(Continued)

OTHER PUBLICATIONS

International Search Report and Written Opinion dated Apr. 28, 2018 in Application No. PCT/CN2018/075626. (9 pages).
(Continued)

*Primary Examiner* — Samuel G Neway
(74) *Attorney, Agent, or Firm* — Oblon, McClelland, Maier & Neustadt, L.L.P.

(57) ABSTRACT

A method for training a voice data set is provided. A first test set of data selected from a first voice data set, and a first voice model parameter obtained by performing first voice model training based on a first voice data set, are obtained. Data from a second voice data set is randomly selected to generate a second test set. Further, second voice model training is performed based on the second voice data set and the first voice model parameter when the second test set and the first test set satisfy a similarity condition.

20 Claims, 6 Drawing Sheets

(51) Int. Cl.
  *G10L 15/04*  (2013.01)
  *G10L 15/14*  (2006.01)
  *G10L 15/22*  (2006.01)
  *G10L 15/16*  (2006.01)
(52) U.S. Cl.
  CPC ............ *G10L 15/144* (2013.01); *G10L 15/22* (2013.01); *G10L 15/16* (2013.01); *G10L 2015/025* (2013.01); *G10L 2015/0635* (2013.01)

(56) References Cited

U.S. PATENT DOCUMENTS

| | | | |
|---|---|---|---|
| 2015/0039301 A1* | 2/2015 | Senior | G10L 15/16 704/232 |
| 2015/0127337 A1* | 5/2015 | Heigold | G10L 15/063 704/232 |
| 2015/0269933 A1* | 9/2015 | Yu | G10L 25/21 704/232 |
| 2017/0032244 A1* | 2/2017 | Kurata | G06N 3/0472 |
| 2018/0277098 A1* | 9/2018 | Min | G06K 9/6262 |
| 2019/0318723 A1* | 10/2019 | Sun | G10L 15/063 |

FOREIGN PATENT DOCUMENTS

| | | |
|---|---|---|
| CN | 104808799 A | 7/2015 |
| CN | 104941203 A | 9/2015 |
| CN | 105955308 A | 9/2016 |
| CN | 106020227 A | 10/2016 |
| CN | 106339006 A | 1/2017 |
| CN | 106774945 A | 5/2017 |
| CN | 106843489 A | 6/2017 |
| JP | 2007027817 A | 2/2007 |

OTHER PUBLICATIONS

Chinese Office Action dated Apr. 23, 2019 in Application No. 201710134711.1 with concise English translation. (7 pages).

Ishitani, "Document Transformation System from Papers to XML Data Based on Pivot XML Document Method," Proceedings of the Seventh International Conference on Document Analysis and Recognition (ICDAR 2003), Dec. 31, 2003. (6 pages).

PCT International Search Report Issued in Application PCT/CN2018/073783 dated Apr. 18, 2018, (11 pages).

Taiwanese Office Action Issued in Application TW10721216880 dated Dec. 2, 2018 (3 pages).

* cited by examiner

METHOD FOR TRAINING VOICE DATA SET, COMPUTER DEVICE, AND COMPUTER-READABLE STORAGE MEDIUM

RELATED APPLICATION

This application is a continuation of International Application No. PCT/CN2018/075595, filed on Feb. 7, 2018, which claims priority to Chinese Patent Application No. 201710143053.2, entitled "METHOD AND APPARATUS FOR TRAINING VOICE DATA SET," filed on Mar. 10, 2017. The entire disclosures of the prior applications are hereby incorporated by reference in their entirety.

FIELD OF THE TECHNOLOGY

This application relates to the field of data processing.

BACKGROUND OF THE DISCLOSURE

Related training of a voice data set usually includes two parts. One part is training of a hidden Markov model (HMM)+a Gaussian mixture model (GMM), and the other part is training of HMM+deep neural network (DNN). HMM+GMM and HMM+DNN need to train an entire data set. With continuous expansion of a data set, a total training time is increased, resulting in a very long training time.

SUMMARY

According to various embodiments of this application, a method for training a voice data set, a computer device, and a computer-readable storage medium are provided.

In one embodiment, a training method is provided. In the method, a first test set of data selected from a first voice data set, and a first voice model parameter obtained by performing first voice model training based on a first voice data set, are obtained by processing circuitry of a computer device. Data from a second voice data set is randomly selected by the processing circuitry to generate a second test set. Further, second voice model training is performed by the processing circuitry based on the second voice data set and the first voice model parameter when the second test set and the first test set satisfy a similarity condition.

In one embodiment, a computer device including processing circuitry is provided. The processing circuitry can include a memory and a processor, the memory storing computer-readable instructions, and the computer-readable instructions, when executed by the processor, causing the processor to perform the training method. The processing circuitry is configured to obtain a first test set of data selected from a first voice data set, and a first voice model parameter obtained by performing first voice model training based on the first voice data set. The processing circuitry is configured to randomly select data from a second voice data set to generate a second test set. Further, the processing circuitry is configured to perform second voice model training based on the second voice data set and the first voice model parameter when the second test set and the first test set satisfy a similarity condition.

In an embodiment, a non-transitory computer-readable storage medium is provided, the non-transitory computer-readable storage medium stores computer-readable instructions, the computer-readable instructions, when executed by one or more processors, causing the one or more processors to perform a training method. A first test set of data selected from a first voice data set, and a first voice model parameter obtained by performing first voice model training based on a first voice data set, are obtained. Data from a second voice data set is randomly selected to generate a second test set. Further, second voice model training is performed based on the second voice data set and the first voice model parameter when the second test set and the first test set satisfy a similarity condition.

Details of one or more embodiments of this application are provided in the following accompanying drawings and descriptions. Other features, objectives, and advantages of this application become more apparent with reference to the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. The accompanying drawings in the following description show only some embodiments of this application, and a person of ordinary skill in the art may still derive other drawings from these accompanying drawings.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

Figure 1:
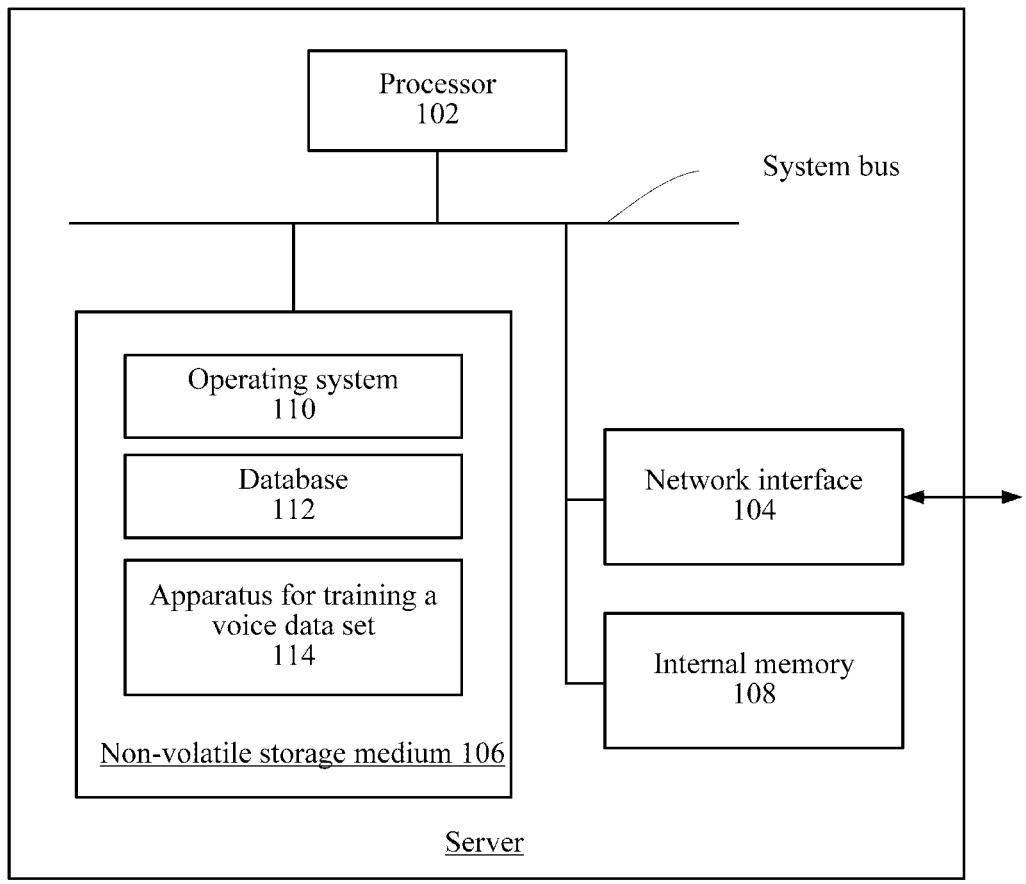
FIG. 1 is a schematic diagram of an internal structure of a computer device in an embodiment.

FIG. 1 is a schematic diagram of an internal structure of a computer device in an embodiment. As shown in FIG. 1, the computer device includes a processor 102, a memory, and a network interface 104 that are connected through a system bus. The memory includes a non-volatile storage medium 106 and an internal memory 108. The non-volatile storage medium 108 of the computer device stores an operating system 110, a database 112, and an apparatus for training a voice data set 114. The database 112 stores HMM+GMM and HMM+DNN algorithm models and the like. The apparatus for training a voice data set 114 is configured to implement a method for training a voice data set applicable to the computer device. The processor 102 of the computer device is configured to provide calculation and control capabilities, to support running of the entire computer device. The internal memory 108 of the computer device provides an environment for running of the apparatus for training a voice data set 114 in the non-volatile storage medium 106. The internal memory 108 (e.g., a non-transitory computer-readable storage medium) may store computer-readable instructions, and the computer-readable instructions, when executed by the processor 102, may cause the processor 102 to perform a method for training a voice data set. The network interface 104 of the computer device is configured to communicate with an external device by using a network connection, for example, receive a speech recognition request sent by the device and return a speech recognition result to the device. The computer device may be implemented as an independent computer device or a computer device cluster constituted by a plurality of computer devices. A person skilled in the art may understand that, the structure shown in FIG. 1 is merely an exemplary block diagram of a partial structure related to the solutions of this application, and does not constitute a limitation to the computer device to which the solutions of this application are applied, and a specific computer device may include more or fewer components than those shown in the figure, or some components may be combined, or a different component deployment may be used.

Figure 2:
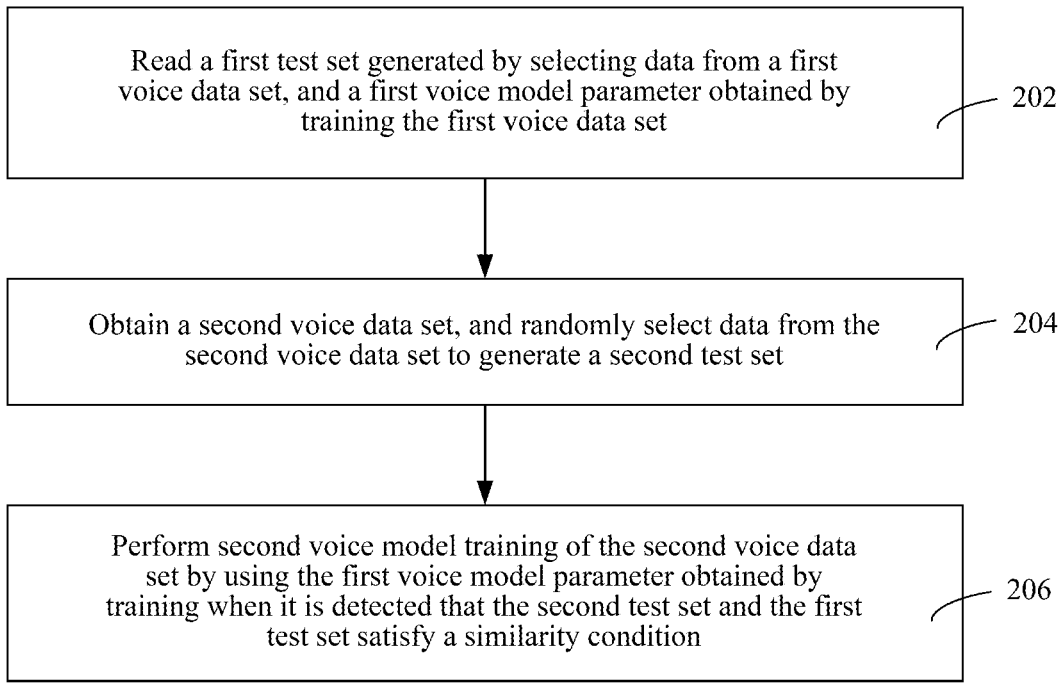
FIG. 2 is a flowchart of a method for training a voice data set in an embodiment.

FIG. 2 is a flowchart of a method for training a voice data set in an embodiment. As shown in FIG. 2, a method for training a voice data set includes:

Step 202: Read a first test set generated by selecting data from a first voice data set, and a first voice model parameter obtained by training the first voice data set.

In this embodiment, the first voice data set is a voice data set used for the first training. The computer device may select data from the first voice data set to generate the first test set. The first test set is a data set used for testing performance of the first voice model obtained by training the first voice data set. The first voice model may be a hidden Markov model and a Gaussian mixture model.

The computer device may read the first test set generated by selecting data from the first voice data set. For example, a manner in which the computer device reads the first test set may be extracting required data in a hard disk through a central processing unit (CPU) in the computer device, and then, the CPU comprehensively processes the data and then, sends the data to an internal memory.

A hidden Markov model and Gaussian mixture model (that is, HMM+GMM) parameter is a duration of each HMM state. Each voice frame corresponds to an HMM state.

A hidden Markov model (HMM) is a statistical model, and is used to describe a Markov process including an implicit unknown parameter. In the hidden Markov model, a state is not directly visible, but some variables affected by the state are visible. A state in the HMM is a basic component of the HMM. A translation probability of the HMM indicates a probability of translation between states of the HMM. Each state has a probability distribution on all possibly output symbols, that is, an output probability of the HMM. The Markov process is a random process having no memory attribute. If a current state and all past states of this random process are given, a condition probability distribution of a future state thereof depends on only the current state.

In a Gaussian mixture model (GMM), an object is accurately quantized by using a Gaussian probability density function (a normal distribution curve), and one object is decomposed into several models formed based on the Gaussian probability density function (the normal distribution curve).

The computer device may select data according to the first voice data set to generate a training set and the first test set in advance. Alternatively, the computer device may obtain a hidden Markov model and a Gaussian mixture model by training a training set of the first voice data set to obtain hidden Markov model and Gaussian mixture model parameters.

Step 204: Obtain a second voice data set, and randomly select data from the second voice data set to generate a second test set.

In this embodiment, the second voice data set is a voice data set used for training again. The computer device may randomly select data from the second voice data set to generate the second test set. The second test set is used to represent the second voice data set. A proportion of a data volume of the second test set in a data volume of the second voice data set is the same as a proportion of a data volume of the first test set in a data volume of the first voice data set.

Step 206: Perform second voice model training of the second voice data set by using the first voice model parameter obtained by training when it is detected that the second test set and the first test set satisfy a similarity condition.

In this embodiment, the second voice model may be a hidden Markov model and a deep neural network model. A deep neural network (DNN) is a neural network having at least one hidden layer. Similar to a shallow neural network, a deep neural network can also provide modeling for a complex non-linear system, but an additional level provides a higher level of abstraction for the model, and therefore, improves a capability of the model. A neural network connects a plurality of individual neurons together, where an output of a neuron may be an input of another neuron. A neuron is a basic operation unit of a neural network, and converts a plurality of input values into one output by using an activation function, where the plurality of input values and a plurality of weights have a one-to-one correspondence. In this embodiment, the similarity condition is that a similarity exceeds a similarity threshold, or a difference between word error rates is less than or equal to a tolerance threshold. If the similarity exceeds the similarity threshold, or the difference between word error rates is less than or equal to the tolerance threshold, it indicates that a similarity between the second test set and the first test set is high, it is proper to perform hidden Markov model and deep neural network model training of the second voice data set by using the hidden Markov model and Gaussian mixture model parameters obtained by training the first voice data set.

In the foregoing method for training a voice data set, if the computer device detects that the second test set generated by selecting data from the second voice data set and the first test set generated by selecting data from the first voice data set satisfy the similarity condition, the computer device performs second voice model training of the second voice data set by using the first voice model parameter obtained by training the first voice data set, thereby omitting first voice model training of the second voice data set, reducing a total training time length, and improving training efficiency.

In an embodiment, randomly selecting data from the second voice data set to generate a second test set includes: obtaining a ratio of a quantity of pieces of data in the first test set to a quantity of pieces of data in the first voice data set, and randomly select data (or randomly selecting data) at the ratio from the second voice data set to generate the second test set.

In this embodiment, a quantity of pieces of data in a first test set TEST1 is recorded as number(TEST1), and a quantity of pieces of data in the first voice data set is recorded as number(data set 1). A quantity of pieces of data in a second test set TEST2 is recorded as number(TEST2), and a quantity of pieces of data in the second voice data set is recorded as number(data set 2). Therefore, number(TEST1)/number (data set 1)=number(TEST2)/number(data set 2) is satisfied.

Making a proportion of a data volume of the second test set in a data volume of the second voice data set be the same as a proportion of a data volume of the first test set in a data volume of the first voice data set can ensure a calculation result is more accurate when similarity calculation is performed.

Figure 3:
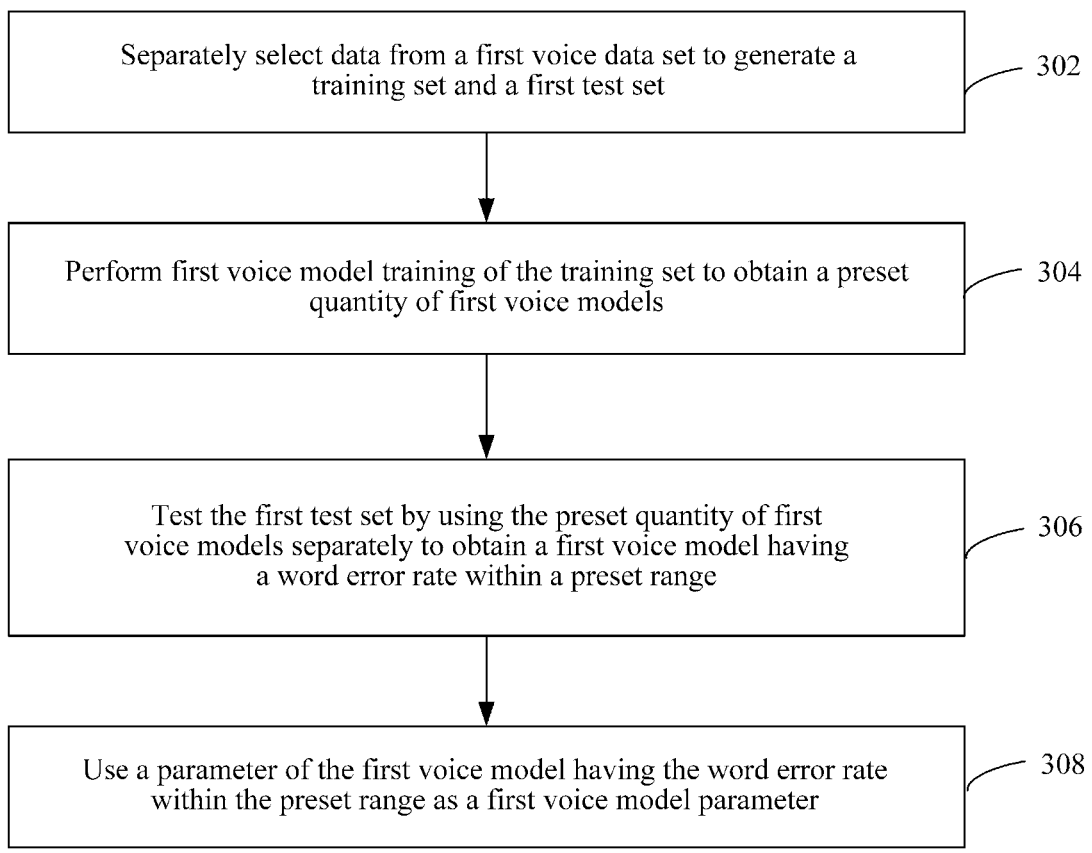
FIG. 3 is a flowchart of a method for training a voice data set in an embodiment.

FIG. 3 is a flowchart of a method for training a voice data set in an embodiment. As shown in FIG. 3, in an embodiment, the foregoing method for training a voice data set further includes the following steps:

Step 302: Separately select data from the first voice data set to generate a training set and the first test set.

A training set is used to estimate a data set of a model.

Step 304: Perform first voice model training of the training set to obtain a preset quantity of first voice models.

In this embodiment, the preset quantity may be set according to requirements to, for example, 5 or 10.

Step 306: Test the first test set by using the preset quantity of first voice models separately to obtain a first voice model having a word error rate within a preset range.

In this embodiment, the computer device tests the first test set by using each first voice model in the preset quantity of first voice models, and the computer device may obtain a word error rate of each first voice model, and sift a first voice model having a word error rate within the preset range according to the word error rate of each first voice model. The preset range may be set according to requirements.

Step 308: Use a parameter of the first voice model having the word error rate within the preset range as the first voice model parameter.

In this embodiment, the parameter of the first voice model having the word error rate within the preset range is a duration of each HMM state obtained by the first voice model having the word error rate within the preset range.

By selecting data from the first voice data set to generate a training set, the computer device trains the training set to obtain a plurality of first voice models. The computer device obtains, by testing the first test set, a first voice model having a word error rate within the preset range. The computer device may use a parameter of a first voice model having the word error rate being a minimum word error rate within the preset range as the first voice model parameter, which is more accurate in subsequent use as a common first voice model parameter. Alternatively, the computer device uses a parameter of any first voice model having a word error rate within the preset range as the first voice model parameter.

In an embodiment, the foregoing method for training a voice data set further includes: performing the second voice model training of the first voice data set by using a parameter of a first voice model having the word error rate being a minimum word error rate within the preset range.

In an embodiment, the foregoing method for training a voice data set further includes: performing the second voice model training of the first voice data set by using a parameter of any first voice model having a word error rate within the preset range.

In an embodiment, performing first voice model training of the training set to obtain a preset quantity of first voice models includes: randomly selecting a first preset proportion of data or a first fixed quantity of pieces of data from the training set each time to perform the first voice model training, and repeating it for a preset quantity of times to obtain the preset quantity of first voice models.

In this embodiment, the first preset proportion may be set according to requirements, an excessively high first preset proportion is time-consuming, and an excessively low first preset proportion cannot represent a whole training set. The first fixed quantity may be set according to requirements. The preset quantity of times is a quantity of times of randomly selecting the first preset proportion of data from the training set or performing first voice model training of the first fixed quantity of pieces of data.

In an embodiment, the testing the first test set by using the preset quantity of first voice models separately to obtain a first voice model having a word error rate within a preset range includes: testing the first test set by using the preset quantity of first voice models separately to obtain a word error rate of each first voice model; and sifting the first voice model having the word error rate within the preset range according to the word error rate of each first voice model.

In this embodiment, a word error rate (WER) is a ratio of a quantity of incorrectly recognized words during testing to a total quantity of words in a test set. The computer device tests the first test set separately by using the preset quantity of first voice models to obtain a word error rate of testing the first test set by using each first voice model. The computer device compares the word error rate with the preset range, so that the computer device can obtain a first voice model having a word error rate within the preset range.

In an embodiment, the detecting that the second test set and the first test set satisfy a similarity condition includes: testing the second test set by using a first voice model having the word error rate being a minimum word error rate within the preset range to obtain a word error rate corresponding to the second test set, where when it is detected that a difference between the word error rate corresponding to the second test set and the word error rate being the minimum word error rate within the preset range is less than or equal to a tolerance threshold, it indicates that the second test set and the first test set satisfy the similarity condition.

In this embodiment, the tolerance threshold may be obtained according to a plurality of times of actual training.

In an embodiment, the method for training a voice data set further includes: separately selecting data from the first voice data set to generate a training set and the first test set; performing first voice model training of the training set to obtain a preset quantity of first voice models; testing the first test set by using the preset quantity of first voice models separately to obtain a first voice model having a minimum word error rate within the preset quantity; and using a parameter of the first voice model having the minimum word error rate within the preset quantity as the first voice model parameter.

In this embodiment, the computer device tests the first test set separately by using the preset quantity of first voice models to obtain a word error rate of testing the first test set by using each first voice model. The computer device ranks the word error rates to obtain a minimum word error rate within the preset quantity of first voice models.

Detecting, by the computer device, that the second test set and the first test set satisfy a similarity condition includes: testing the second test set by using a first voice model corresponding to a minimum word error rate within the preset quantity of first voice models to obtain a word error rate corresponding to the second test set, where when it is detected that a difference between the word error rate corresponding to the second test set and the minimum word error rate within the preset quantity of first voice models is less than or equal to a tolerance threshold, it indicates that the second test set and the first test set satisfy the similarity condition.

In an embodiment, a step of obtaining a duration of each HMM state by using an HMM+GMM model includes: obtaining voice data, segmenting the voice data, and extracting a feature of each voice segment; listing all possible words corresponding to each voice segment; converting the words into phonemes according to a pronunciation dictionary; converting the phonemes into an HMM state according to an HMM model; obtaining a probability corresponding to each word according to a parameter of the HMM+GMM model; obtaining a most possible HMM state sequence by comparing probabilities; and obtaining the duration of each HMM state according to the HMM state sequence.

Extracted features of voice may include sound intensity and a sound intensity level, loudness, a pitch, a pitch period, a pitch frequency, a signal-to-noise ratio, a harmonic-to-noise ratio, and the like. The sound intensity is average acoustic energy passing through a unit area perpendicular to a sound wave propagation direction per unit time. The sound intensity is represented by I, and its unit is watt/square meter. The sound intensity is represented by using the sound intensity level. A common unit of the sound intensity level is decibel (dB). The loudness represents sound intensity. The loudness is represented by a loudness level. The pitch is a feeling of a human auditory system about a sound frequency. The unit of the pitch is mel. The pitch period reflects a time interval between two consecutive times of opening and closing of the glottis or a frequency of opening and closing of the glottis. The signal-to-noise ratio is a calculated ratio of a power of a signal to a power of noise. The harmonic-to-noise ratio is a ratio of a harmonic component to a noise component.

The phoneme is a minimum phonetic unit obtained by performing division according to a natural attribute of voice. Voice data is annotated to obtain a phoneme. Annotation is processing unprocessed data, and an annotation of voice is presenting real content represented by the voice.

An HMM state sequence obtained by the computer device is similar to 112233345, and assuming that it is started from a moment t, a duration of a state 1 is t to t+2, and a duration of a state 2 is t+3 to t+4.

Figure 4:
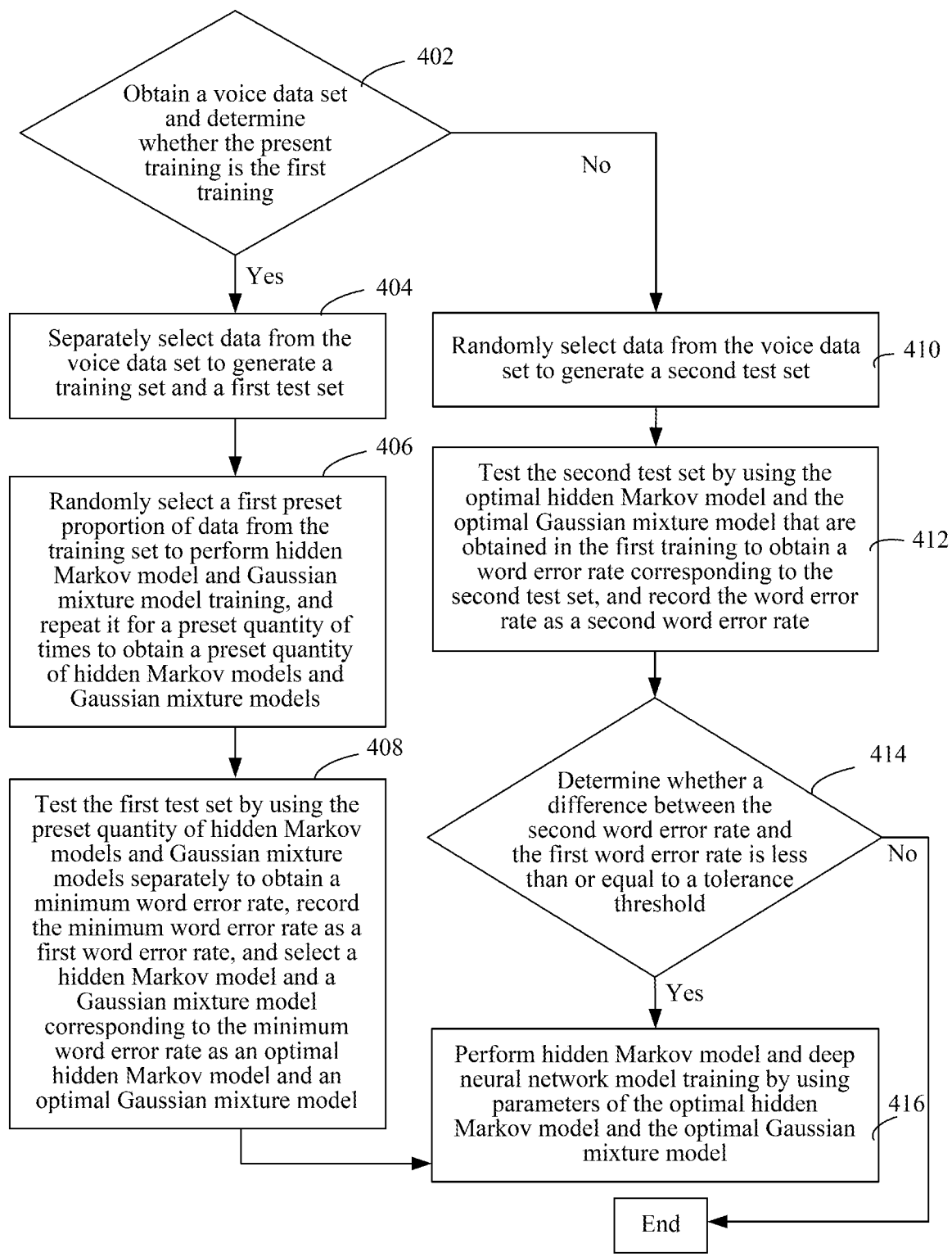
FIG. 4 is a flowchart of a method for training a voice data set in an embodiment.

FIG. 4 is a flowchart of a method for training a voice data set in an embodiment. As shown in FIG. 4, a method for training a voice data set includes:

Step 402: Obtain a voice data set, determine whether the current training is the first training, if the current training is the first training, perform step 404, and if the current training is not the first training, perform the step 410.

Step 404: Separately select data from the voice data set to generate a training set and the first test set.

If the current training is the first training, the voice data set may be referred to as a first voice data set.

Step 406: Randomly select a first preset proportion of data from the training set each time to perform hidden Markov model and Gaussian mixture model training, and repeat it for a preset quantity of times to obtain a preset quantity of hidden Markov models and Gaussian mixture models.

Step 408: Test the first test set by using the preset quantity of hidden Markov models and Gaussian mixture models separately to obtain a minimum word error rate, record the minimum word error rate as a first word error rate, select a hidden Markov model and a Gaussian mixture model corresponding to the minimum word error rate as an optimal hidden Markov model and an optimal Gaussian mixture model, and then, perform step 416.

Step 410: Randomly select data from the voice data set to generate a second test set.

If the current training is not the first training, the voice data set may be referred to as a second voice data set.

Step 412: Test the second test set by using the optimal hidden Markov model and the optimal Gaussian mixture model that are obtained in the first training to obtain a word error rate corresponding to the second test set, and record the word error rate as a second word error rate.

Step 414: Determine whether a difference between the second word error rate and the first word error rate is less than or equal to a tolerance threshold, if the difference is less than or equal to the tolerance threshold, perform step 416, and if the difference is not less than or equal to the tolerance threshold, end the process.

Step 416: Perform hidden Markov model and deep neural network model training by using parameters of the optimal hidden Markov model and the optimal Gaussian mixture model. In the foregoing method for training a voice data set, if it is detected that the current training is not the first training, and for the first word error rate obtained by testing the first test set according to the optimal HMM+GMM model and the second word error rate obtained by testing the second test set according to the optimal HMM+GMM model, a difference between the second word error rate and the first word error rate is less than or equal to the tolerance threshold, hidden Markov model and deep neural network model training of the second voice data set is performed by using the hidden Markov model and Gaussian mixture model parameter obtained by training the first voice data set, thereby omitting hidden Markov model and deep neural network model training of the second voice data set, reducing a total training time length, and improving training efficiency. If the current training is the first training, the optimal HMM+GMM model is selected, and HMM+DNN training is performed by using the optimal HMM+GMM model.

Figure 5:
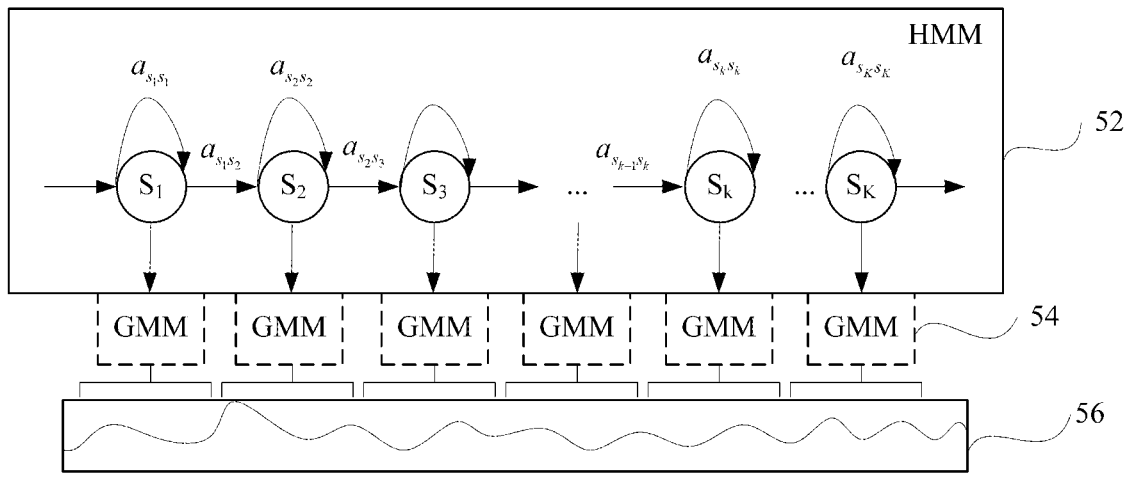
FIG. 5 is a schematic structural diagram of an HMM+GMM model in an embodiment.

FIG. 5 is a schematic structural diagram of an HMM+GMM model in an embodiment. As shown in FIG. 5, a first layer 52 is voice frame data one piece by one piece, a second layer 54 is a GMM model, and a third layer 56 is an HMM model. The HMM model corresponds to a plurality of GMM models of output probabilities. S represents an HMM state in the HMM model; a represents a translation probability in the HMM model, and $a_{s_{k-1}s_k}$ represents a translation probability of changing from an $s_{k-1}$ state to an $s_{k-2}$ state. Each GMM corresponds to an output probability of an HMM model state. The computer device splits voice data into voice frame data one piece by one piece, and a piece of voice frame data corresponds to an HMM state. A voice frame is an observed value in the HMM.

Figure 6:
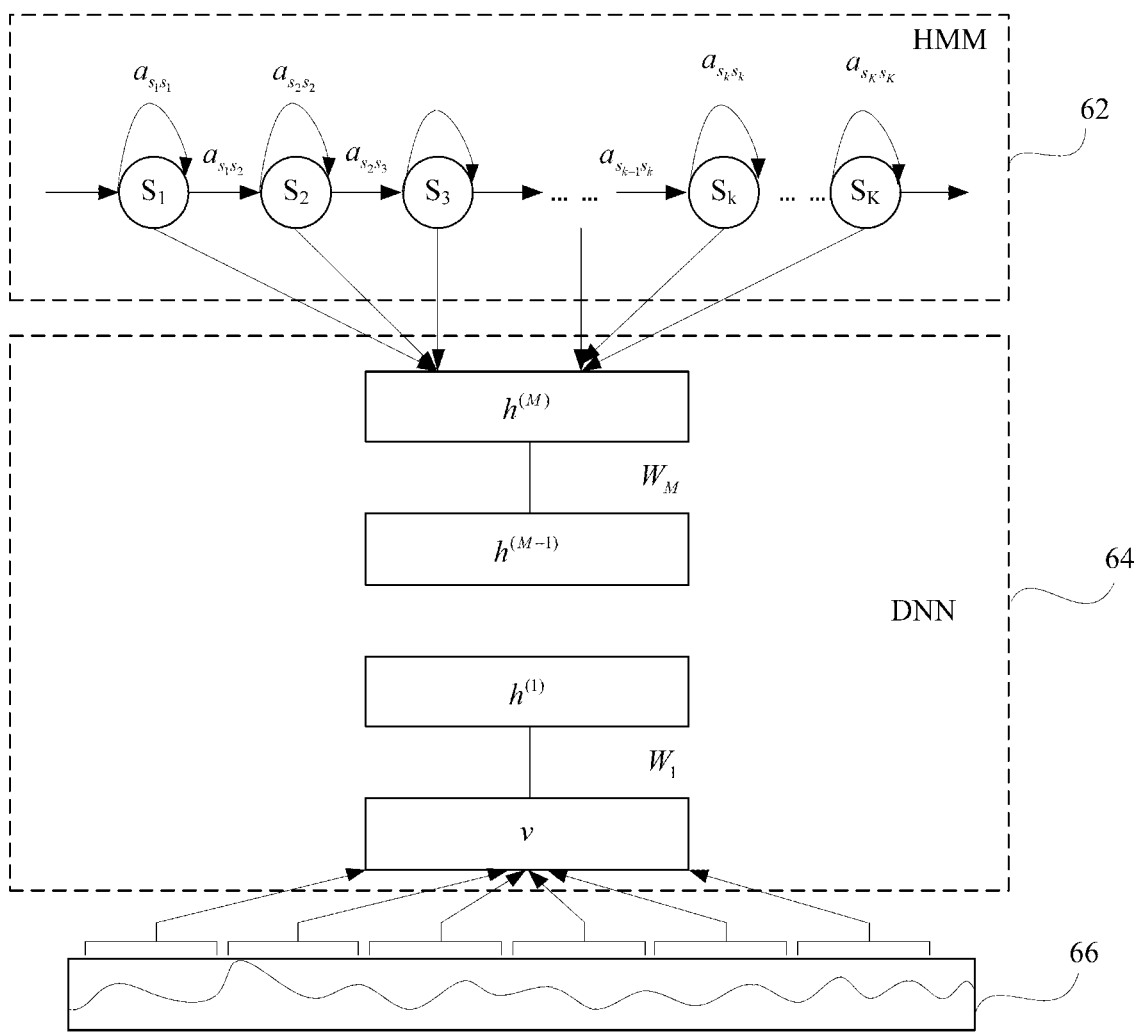
FIG. 6 is a schematic structural diagram of an HMM+DNN model in an embodiment.

FIG. 6 is a schematic structural diagram of an HMM+DNN model in an embodiment. As shown in FIG. 6, a first layer 62 is voice frame data one piece by one piece, a second layer 64 is a DNN model, and a third layer 66 is an HMM model. S represents an HMM state in the HMM model; a represents a translation probability in the HMM model, $a_{s_{k-1}s_k}$ represents a translation probability of changing from an $s_{k-1}$ state to an $s_{k-2}$ state; h represents a neuron in the DNN model; and W represents a weight in the DNN model, and M represents a quantity of layers of the DNN model. h represents a function, if h is the first layer, an input of h is a weight corresponding to a frame of data or several frames of data; and if h is one of the second to the last layers, input of h is an output of a previous layer and a weight corresponding to each output. Each output of the DNN corresponds to an output probability of an HMM model state. Each output of the DNN corresponds to a voice frame.

In an embodiment, a probability corresponding to inputting a voice frame and outputting an HMM state may be implemented by using a DNN model in a time domain.

Figure 7:
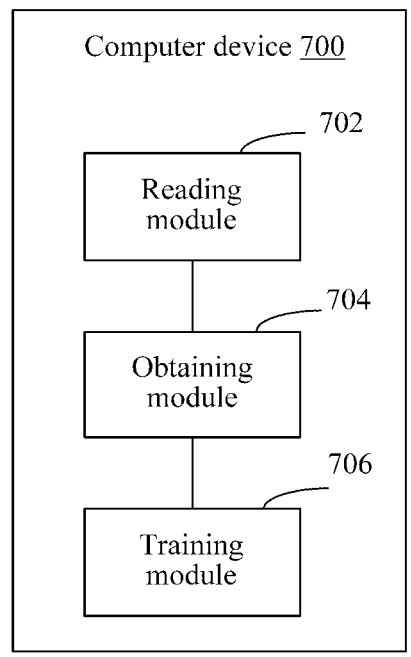
FIG. 7 is a structural block diagram of an apparatus for training a voice data set in an embodiment.

FIG. 7 is a structural block diagram of an apparatus for training a voice data set in an embodiment. As shown in FIG. 7, an apparatus 700 for training a voice data set includes a reading module 702, an obtaining module 704, and a training module 706.

The reading module 702 is configured to read a first test set generated by selecting data from a first voice data set, and a first voice model parameter obtained by training the first voice data set.

In this embodiment, the first voice data set is a voice data set used for the first training. The computer device may select data from the first voice data set to generate the first test set. The first test set is a data set used for testing performance of the first voice model obtained by training the first voice data set.

The first voice model parameter is a duration of each voice model state. For example, the first voice model parameter may be a duration of each HMM state. Each voice frame corresponds to an HMM state.

The obtaining module 704 is configured to: obtain a second voice data set, and randomly select data from the second voice data set to generate a second test set.

The training module 706 is configured to perform second voice model training of the second voice data set by using the first voice model parameter obtained by training when it is detected that the second test set and the first test set satisfy a similarity condition.

The first voice model may be a hidden Markov model and a Gaussian mixture model. The second voice model may be a hidden Markov model and a deep neural network model.

In the foregoing apparatus for training a voice data set, if it is detected that the second test set generated by selecting data from the second voice data set and the first test set generated by selecting data from the first voice data set satisfy the similarity condition, the computer device may perform second voice model training of the second voice data set by using the first voice model parameter obtained by training the first voice data set, thereby omitting first voice model training of the second voice data set, reducing a total training time length, and improving training efficiency.

Figure 8:
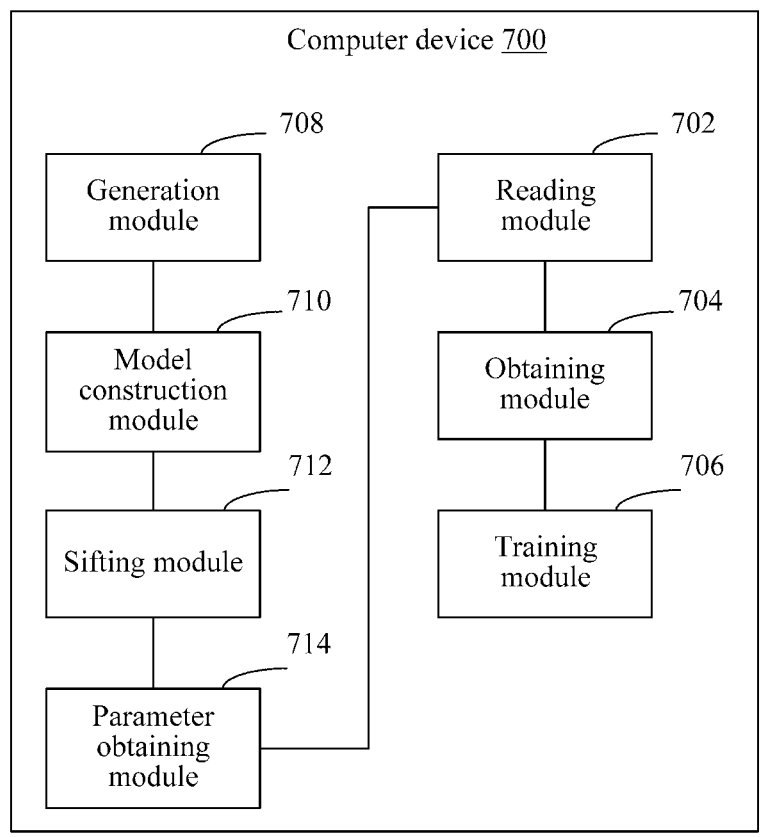
FIG. 8 is a structural block diagram of an apparatus for training a voice data set in an embodiment.

FIG. 8 is a structural block diagram of an apparatus for training a voice data set in an embodiment. As shown in FIG. 8, in addition to the reading module 702, the obtaining module 704, and the training module 706, the apparatus 700 for training a voice data set further includes a generation module 708, a model construction module 710, a sifting module 712, and a parameter obtaining module 714. In this embodiment, the apparatus 700 for training a voice data set forms at least one part of the computer device, and the modules 702 to 714 may perform corresponding operations through the computer device.

The generation module 708 is configured to separately select data from the first voice data set to generate a training set and the first test set.

In an embodiment, the generation module 708 is further configured to obtain a ratio of a quantity of pieces of data in the first test set to a quantity of pieces of data in the first voice data set, and randomly select data at the ratio from the second voice data set to generate the second test set.

The model construction module 710 is configured to perform first voice model training of the training set to obtain a preset quantity of first voice models.

The sifting module 712 is configured to test the first test set by using the preset quantity of first voice models to obtain a first voice model having a word error rate within a preset range.

The parameter obtaining module 714 is configured to use a parameter of the first voice model having the word error rate within the preset range as the first voice model parameter.

The training module 706 is further configured to perform second voice model training of the first voice data set by using a parameter of the first voice model having the word error rate within the preset range.

By selecting data from the first voice data set to generate a training set, the computer device may train the training set to obtain a plurality of first voice models. The computer device may obtain an optimal first voice model by testing the first test set. The computer device may use a parameter of any first voice model having a word error rate within the preset range as the first voice model parameter, or the computer device may use a parameter of a first voice model having a word error rate being a minimum word error rate within the preset range as the first voice model parameter, which is more accurate in subsequent use as a common first voice model parameter.

In an embodiment, the model construction module 710 is further configured to: randomly select a first preset proportion of data or a first fixed quantity of pieces of data from the training set each time to perform the first voice model training, and repeat it for a preset quantity of times to obtain the preset quantity of first voice models.

In an embodiment, the sifting module 712 is further configured to test the first test set by using the preset quantity of first voice models separately to obtain a word error rate of each first voice model; and sift the first voice model having the word error rate within the preset range according to the word error rate of each first voice model.

Figure 9:
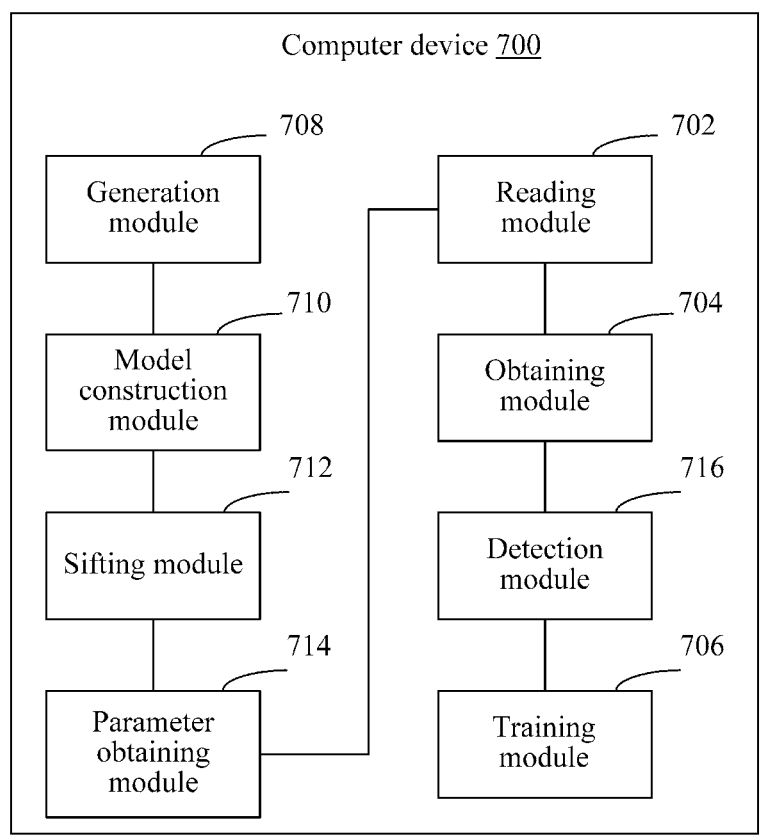
FIG. 9 is a structural block diagram of an apparatus for training a voice data set in an embodiment.

FIG. 9 is a structural block diagram of an apparatus for training a voice data set in an embodiment. As shown in FIG. 9, in addition to the reading module 702, the obtaining module 704, the training module 706, the generation module 708, the model construction module 710, the sifting module 712, and the parameter obtaining module 714, the apparatus 700 for training a voice data set further includes a detection module 716.

The detection module 716 is configured to test the second test set by using a first voice model corresponding to the word error rate being the minimum word error rate within the preset range to obtain a word error rate corresponding to the second test set, where when it is detected that a difference between the word error rate corresponding to the second test set and the word error rate being the minimum word error rate within the preset range is less than or equal to a tolerance threshold, it indicates that the second test set and the first test set satisfy the similarity condition.

In an embodiment, the generation module 708 is further configured to separately select data from the first voice data set to generate a training set and the first test set.

The model construction module 710 is configured to perform first voice model training of the training set to obtain a preset quantity of first voice models.

The sifting module 712 is configured to test the first test set by using the preset quantity of first voice models separately to obtain a first voice model having a minimum word error rate within the preset quantity.

The parameter obtaining module 714 is configured to use a parameter of the first voice model having the minimum word error rate as the first voice model parameter.

The detection module 716 is configured to test the second test set by using a first voice model corresponding to the minimum word error rate within the preset quantity to obtain a word error rate corresponding to the second test set, where when it is detected that a difference between the word error rate corresponding to the second test set and the minimum word error rate within the preset quantity is less than or equal to a tolerance threshold, it indicates that the second test set and the first test set satisfy the similarity condition.

Division of the respective modules in the foregoing apparatus for training a voice data set is merely used for illustration. In some embodiment, the apparatus for training a voice data set may be divided into different modules according to requirements, so as to implement all or some of the functions of the foregoing apparatus for training a voice data set.

The embodiments of the present disclosure further provide a computer device and a computer-readable storage medium.

A computer device includes processing circuitry such as a memory and a processor. The memory, the processor, and a computer program (instructions) that is stored in the memory and can run on the processor, and when executing the program, the processor performs the following steps: reading a first test set generated by selecting data from a first voice data set, and a first voice model parameter obtained by training the first voice data set; obtaining a second voice data set, and randomly selecting data from the second voice data set to generate a second test set; and performing second voice model training of the second voice data set by using the first voice model parameter obtained by training when detecting that the second test set and the first test set satisfy a similarity condition. The first voice model may be a hidden Markov model and a Gaussian mixture model. The second voice model may be a hidden Markov model and a deep neural network model.

In an embodiment, the processor is further configured to perform, when executing the program, the following steps: separately selecting data from the first voice data set to generate a training set and the first test set; performing first voice model training of the training set to obtain a preset quantity of first voice models; testing the first test set by using the preset quantity of first voice models separately to obtain a first voice model having a word error rate within a preset range; and using a parameter of the first voice model having the word error rate within the preset range as the first voice model parameter.

In an embodiment, the processor is further configured to perform first voice model training of the training set to obtain a preset quantity of first voice models, including: randomly selecting a first preset proportion of data or a first fixed quantity of pieces of data from the training set each time to perform the first voice model training, and repeating it for a preset quantity of times to obtain the preset quantity of first voice models.

In an embodiment, the processor is further configured to test the first test set by using the preset quantity of first voice models separately to obtain a first voice model having a word error rate within a preset range, including: testing the first test set by using the preset quantity of first voice models separately to obtain a word error rate of each first voice model; and sifting the first voice model having the word error rate within the preset range according to the word error rate of each first voice model.

In an embodiment, the processor is further configured to detect that the second test set and the first test set satisfy a similarity condition, including: testing the second test set by using a first voice model corresponding to the word error rate being a minimum word error rate within the preset range to obtain a word error rate corresponding to the second test set, where when it is detected that a difference between the word error rate corresponding to the second test set and the word error rate being the minimum word error rate within the preset range is less than or equal to a tolerance threshold, it indicates that the second test set and the first test set satisfy the similarity condition.

In an embodiment, the processor is further configured to separately select data from the first voice data set to generate a training set and the first test set; perform first voice model training of the training set to obtain a preset quantity of first voice models; test the first test set by using the preset quantity of first voice models separately to obtain a first voice model having a minimum word error rate within the preset quantity; and use a parameter of the first voice model having the minimum word error rate as the first voice model parameter.

In an embodiment, the processor is further configured to test the second test set by using a first voice model corresponding to the minimum word error rate within the preset quantity to obtain a word error rate corresponding to the second test set, where when it is detected that a difference between the word error rate corresponding to the second test set and the minimum word error rate within the preset quantity is less than or equal to a tolerance threshold, it indicates that the second test set and the first test set satisfy the similarity condition.

In an embodiment, the processor is further configured to randomly select data from the second voice data set to generate a second test set, including: obtaining a ratio of a quantity of pieces of data in the first test set to a quantity of pieces of data in the first voice data set, and selecting random data at the ratio from the second voice data set to generate the second test set.

A computer-readable storage medium (e.g., a non-transitory computer-readable medium) stores a computer program, and performs, when the program is executed by a processor, the following steps: reading a first test set generated by selecting data from a first voice data set, and a first voice model parameter obtained by training the first voice data set; obtaining a second voice data set, and randomly selecting data from the second voice data set to generate a second test set; and performing second voice model training of the second voice data set by using the first voice model parameter obtained by training when detecting that the second test set and the first test set satisfy a similarity condition. The first voice model may be a hidden Markov model and a Gaussian mixture model. The second voice model may be a hidden Markov model and a deep neural network model.

In an embodiment, the processor is further configured to perform, when executing the program, the following steps: separately selecting data from the first voice data set to generate a training set and the first test set; performing first voice model training of the training set to obtain a preset quantity of first voice models; testing the first test set by using the preset quantity of first voice models separately to obtain an optimal first voice model; and using a parameter of the optimal first voice model as the first voice model parameter.

In an embodiment, the processor is further configured to perform first voice model training of the training set to obtain a preset quantity of first voice models, including: randomly selecting a first preset proportion of data or a first fixed quantity of pieces of data from the training set each time to perform the first voice model training, and repeating it for a preset quantity of times to obtain the preset quantity of first voice models.

In an embodiment, the processor is further configured to test the first test set by using the preset quantity of first voice models separately to obtain an optimal first voice model, including: testing the first test set by using the preset quantity of first voice models separately to obtain a word error rate of each first voice model; and sifting the first voice model having the word error rate within the preset range according to the word error rate of each first voice model.

In an embodiment, the processor is further configured to detect that the second test set and the first test set satisfy a similarity condition, including: testing the second test set by using a first voice model corresponding to the word error rate being a minimum word error rate within the preset range to obtain a word error rate corresponding to the second test set, where when it is detected that a difference between the word error rate corresponding to the second test set and the word error rate being the minimum word error rate within the preset range is less than or equal to a tolerance threshold, it indicates that the second test set and the first test set satisfy the similarity condition.

In an embodiment, the processor is further configured to randomly select data from the second voice data set to generate a second test set, including: obtaining a ratio of a quantity of pieces of data in the first test set to a quantity of pieces of data in the first voice data set, and selecting random data at the ratio from the second voice data set to generate the second test set.

In an embodiment, the processor is further configured to separately select data from the first voice data set to generate a training set and the first test set; perform first voice model training of the training set to obtain a preset quantity of first voice models; test the first test set by using the preset quantity of first voice models separately to obtain a first voice model having a minimum word error rate within the preset quantity; and use a parameter of the first voice model having the minimum word error rate as the first voice model parameter.

In an embodiment, the processor is further configured to test the second test set by using a first voice model corresponding to the minimum word error rate within the preset quantity to obtain a word error rate corresponding to the second test set, where when it is detected that a difference between the word error rate corresponding to the second test set and the minimum word error rate within the preset quantity is less than or equal to a tolerance threshold, it indicates that the second test set and the first test set satisfy the similarity condition.

In an embodiment, the computer-readable medium is a non-volatile or non-transitory storage medium, so that a medium, such as energy or electromagnetic waves, may be excluded.

A person of ordinary skill in the art may understand that all or some of the processes of the methods in the foregoing embodiments may be implemented by a computer program instructing relevant hardware. The program may be stored in a non-volatile or non-transitory computer-readable storage medium. When the program runs, the processes of the foregoing methods in the embodiments are performed. The storage medium may be a magnetic disc, a compact disc, a read-only memory (ROM), or the like.

The foregoing embodiments only show several implementations of this application and are described in detail, but they should not be construed as a limit to the patent scope of this application. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A training method, the method comprising:
obtaining, by processing circuitry of a computer device, a first test set of data selected from a first voice data set, and a first voice model parameter obtained by performing first voice model training of a first voice model based on the first voice data set;
randomly selecting, by the processing circuitry, data from a second voice data set to generate a second test set; and
performing, by the processing circuitry, second voice model training of a second voice model based on the second voice data set and the first voice model parameter when the second test set and the first test set are determined to satisfy a similarity condition, the first and second voice models corresponding to different types of algorithm models.

2. The method according to claim 1,
wherein the step of obtaining the first voice model parameter includes:
separately selecting data from the first voice data set to generate a training set and the first test set;
performing the first voice model training based on the training set to obtain a preset quantity of first voice models;
testing the first test set with the preset quantity of first voice models separately to obtain at least one first voice model having a word error rate within a preset range; and
wherein the first voice model parameter is a parameter of one of the at least one first voice model having the word error rate within the preset range.

3. The method according to claim 2, wherein the performing the first voice model training comprises:
randomly selecting a first preset proportion of data or a first fixed quantity of pieces of the data from the training set each time to perform the first voice model training, and repeating the first voice model training to obtain the preset quantity of first voice models.

4. The method according to claim 2, wherein the testing the first test set comprises:
testing the first test set with the preset quantity of first voice models separately to obtain a word error rate of each of the first voice models; and
determining the at least one first voice model having the word error rate within the preset range according to the word error rate of each of the first voice models.

5. The method according to claim 2, wherein the performing the second voice model training comprises:
performing the second voice model training based on the second voice data set and the first voice model parameter of the first voice model having the word error rate being a minimum word error rate within the preset range.

6. The method according to claim 5, further comprising:
testing, by the processing circuitry, the second test set with the first voice model corresponding to the word error rate being the minimum word error rate within the preset range to obtain a word error rate corresponding to the second test set, and
when a difference between the word error rate corresponding to the second test set and the minimum word error rate within the preset range is less than or equal to a tolerance threshold, determining, by the processing circuitry, that the second test set and the first test set satisfy the similarity condition.

7. The method according to claim 1, wherein the randomly selecting the data from the second voice data set comprises:
obtaining a ratio of a quantity of pieces of the data in the first test set to a quantity of pieces of data in the first voice data set, and randomly selecting the data from the second voice data set according to the ratio to generate the second test set.

8. The method according to claim 1, further comprising:
separately selecting, by the processing circuitry, the data from the first voice data set to generate a training set and the first test set;
performing, by the processing circuitry, the first voice model training based on the training set to obtain a preset quantity of first voice models;
testing, by the processing circuitry, the first test set with the preset quantity of first voice models separately to obtain a first voice model of the preset quantity of first voice models having a minimum word error rate; and
updating, by the processing circuitry, the first voice model parameter based on a parameter of the first voice model having the minimum word error rate.

9. The method according to claim 8, further comprising:
testing, by the processing circuitry, the second test set with the first voice model having the minimum word error rate to obtain a word error rate corresponding to the second test set; and
when a difference between the word error rate corresponding to the second test set and the minimum word error rate is less than or equal to a tolerance threshold, determining, by the processing circuitry, that the second test set and the first test set satisfy the similarity condition.

10. The method according to claim 1, further comprising:
obtaining voice data, segmenting the voice data into voice segments, and extracting a feature of each of the voice segments;
listing words corresponding to each of the voice segments;
converting the words into phonemes according to a pronunciation dictionary;
converting the phonemes into a hidden Markov model state according to a hidden Markov model;
obtaining a probability corresponding to each word according to a parameter of the hidden Markov model and a parameter of a Gaussian mixture model;
obtaining a hidden Markov model state sequence by comparing the probabilities; and
obtaining a duration of each hidden Markov model state according to the hidden Markov model state sequence.

11. A computer device, comprising:
processing circuitry configured to
obtain a first test set of data selected from a first voice data set, and a first voice model parameter obtained by performing first voice model training of a first voice model based on the first voice data set;
randomly select data from a second voice data set to generate a second test set; and
perform second voice model training of a second voice model based on the second voice data set and the first voice model parameter when the second test set and the first test set are determined to satisfy a similarity condition, the first and second voice models corresponding to different types of algorithm models.

12. The computer device according to claim 11, wherein the processing circuitry is configured to:
separately select data from the first voice data set to generate a training set and the first test set;
perform the first voice model training based on the training set to obtain a preset quantity of first voice models; and
test the first test set with the preset quantity of first voice models separately to obtain at least one first voice model having a word error rate within a preset range,
wherein the first voice model parameter is a parameter of one of the at least one first voice model having the word error rate within the preset range as the first voice model parameter.

13. The computer device according to claim 12, wherein the processing circuitry is configured to:
randomly select a first preset proportion of data or a first fixed quantity of pieces of the data from the training set each time to perform the first voice model training, and repeat the first voice model training to obtain the preset quantity of first voice models.

14. The computer device according to claim 12, wherein the processing circuitry is configured to:
test the first test set with the preset quantity of first voice models separately to obtain a word error rate of each of the first voice models; and
determine the at least one first voice model having the word error rate within the preset range according to the word error rate of each of the first voice models.

15. The computer device according to claim 14, wherein the processing circuitry is configured to:
perform the second voice model training based on the second voice data set and the first voice model parameter of the first voice model having the word error rate being a minimum word error rate within the preset range.

16. The computer device according to claim 15, wherein the processing circuitry is configured to:
test the second test set with the first voice model corresponding to the word error rate being the minimum word error rate within the preset range to obtain a word error rate corresponding to the second test set; and
when a difference between the word error rate corresponding to the second test set and the minimum word error rate within the preset range is less than or equal to a tolerance threshold, determine that the second test set and the first test set satisfy the similarity condition.

17. The computer device according to claim 12, wherein the processing circuitry is configured to:
obtain a ratio of a quantity of pieces of the data in the first test set to a quantity of pieces of data in the first voice data set, and randomly select the data from the second voice data set according to the ratio to generate the second test set.

18. The computer device according to claim 12, wherein the processing circuitry is configured to:
separately select the data from the first voice data set to generate a training set and the first test set;
perform the first voice model training based on the training set to obtain a preset quantity of first voice models;

test the first test set with the preset quantity of first voice models separately to obtain a first voice model of the preset quantity of first voice models having a minimum word error rate; and update the first voice model parameter based on a parameter of the first voice model having the minimum word error rate.

19. The computer device according to claim 18, wherein the processing circuitry is configured to:

test the second test set with the first voice model having the minimum word error rate within the preset quantity to obtain a word error rate corresponding to the second test set; and when a difference between the word error rate corresponding to the second test set and the minimum word error rate is less than or equal to a tolerance threshold, determine that the second test set and the first test set satisfy the similarity condition.

20. A non-transitory computer-readable storage medium, storing computer-readable instructions, the computer-readable instructions, when executed by one or more processors, causing the one or more processors to perform:

obtaining a first test set of data from a first voice data set, and a first voice model parameter obtained by performing first voice model training of a first voice model based on the first voice data set;

randomly selecting data from a second voice data set to generate a second test set; and performing second voice model training of a second voice model based on the second voice data set and the first voice model parameter when the second test set and the first test set are determined to satisfy a similarity condition, the first and second voice models corresponding to different types of algorithm models.

* * * * *